(12) United States Patent
Wilson-Jones

(10) Patent No.: US 12,275,464 B2
(45) Date of Patent: Apr. 15, 2025

(54) ELECTRIC POWER STEERING

(71) Applicant: ZF AUTOMOTIVE UK LIMITED, Solihull (GB)

(72) Inventor: Russell Wilson-Jones, Stratford-upon-Avon (GB)

(73) Assignee: ZF AUTOMOTIVE UK LIMITED, West Midlands (GB)

( * ) Notice: Subject to any disclaimer, the term of this patent is extended or adjusted under 35 U.S.C. 154(b) by 1055 days.

(21) Appl. No.: 17/076,723

(22) Filed: Oct. 21, 2020

(65) Prior Publication Data

US 2021/0114651 A1  Apr. 22, 2021

(30) Foreign Application Priority Data

Oct. 21, 2019 (GB) ...................................... 1915192

(51) Int. Cl.
*A01B 69/00* (2006.01)
*B62D 5/04* (2006.01)

(52) U.S. Cl.
CPC ......... *B62D 5/0421* (2013.01); *B62D 5/0454* (2013.01); *B62D 5/0481* (2013.01)

(58) Field of Classification Search
CPC ... B62D 5/0421; B62D 5/0454; B62D 5/0481
See application file for complete search history.

(56) References Cited

U.S. PATENT DOCUMENTS

| | | | |
|---|---|---|---|
| 4,924,696 A | 5/1990 | Schroeder et al. | |
| 5,314,035 A | 5/1994 | Schoell | |
| 2002/0053903 A1 | 5/2002 | Kempe | |
| 2002/0124663 A1* | 9/2002 | Tokumoto | G01L 3/104 73/862.333 |
| 2006/0185460 A1* | 8/2006 | Shiino | B62D 3/123 74/422 |
| 2011/0308330 A1* | 12/2011 | May | G01L 3/102 73/862.69 |
| 2016/0304125 A1* | 10/2016 | Füßl | B62D 15/0225 |
| 2017/0190359 A1 | 7/2017 | Hong | |
| 2020/0198689 A1* | 6/2020 | Ashida | B62D 5/001 |

FOREIGN PATENT DOCUMENTS

| | | |
|---|---|---|
| DE | 10150305 A1 | 10/2002 |
| FR | 2800458 A1 | 5/2001 |
| JP | S6212457 A | 1/1987 |
| JP | H01127909 A | 5/1989 |
| WO | 2018233849 A1 | 12/2018 |

* cited by examiner

*Primary Examiner* — Adam M Alharbi
(74) *Attorney, Agent, or Firm* — Tarolli, Sundheim, Covell & Tummino LLP

(57) ABSTRACT

An electric power steering system includes: a steering bar, an electric motor, a linear position sensor, and a sensing means. The steering bar is mechanically connected at each opposing end to a respective wheel carrier. The linear position sensor having one elongate feature that extends diagonally along a length of the steering bar such that it is inclined relative to the axis of the steering bar. The sensing means faces the steering bar and at any given time observes only a slice of the elongate feature that extends across the full width of the feature and along only a part of the length of the feature. The sensing means generates a signal that varies depending on the pattern formed by the feature and adjacent portions of the steering bar that is observed by the sensing means.

11 Claims, 7 Drawing Sheets

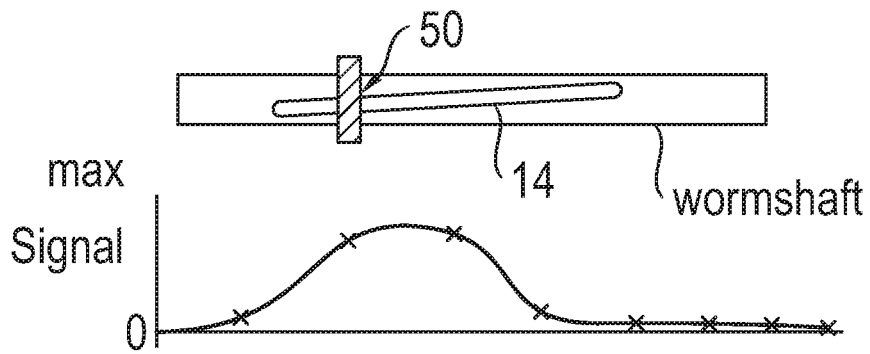
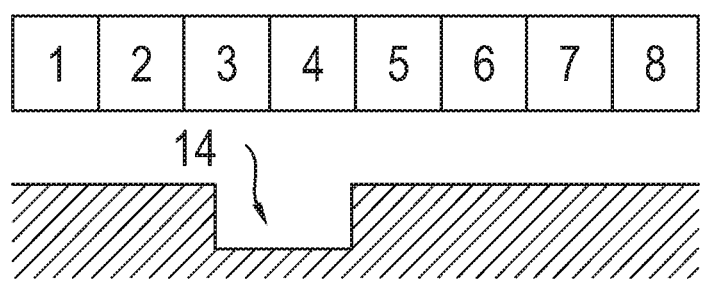
Fig. 9 — Full lefthand lock
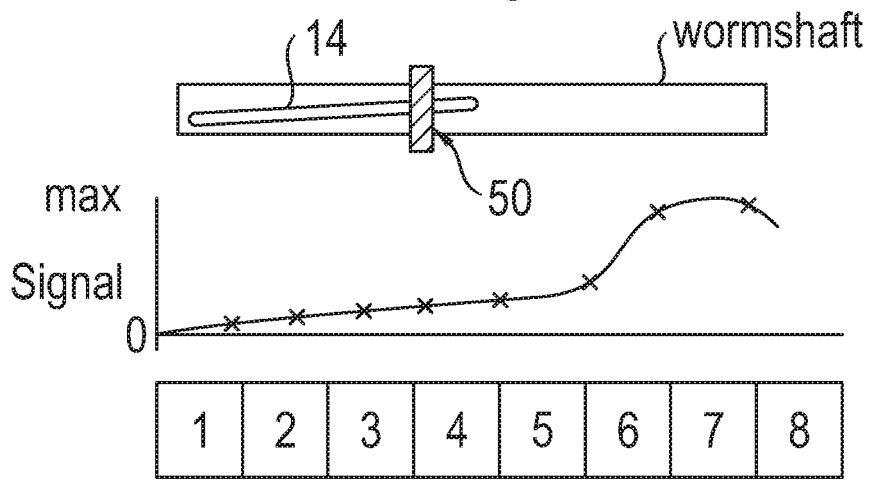
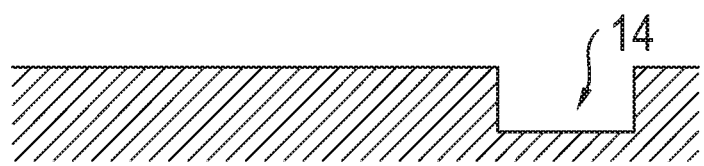
Fig. 10 — Full righthand lock

ELECTRIC POWER STEERING

CROSS-REFERENCE TO RELATED APPLICATION

This application claims priority to UK Patent Application No. 1915192.7 filed Oct. 21, 2019, the disclosure of which is incorporated herein by reference in its entirety.

TECHNICAL FIELD

The present disclosure relates to an electric power steering system and in particular to a steer by wire power steering system.

BACKGROUND

In one conventional arrangement of an unassisted steering system for an automobile, a steering wheel is connected to a steering shaft. This is in turn connected to a steering gear. There are two solutions in common use to connect the motor to the "rack", i.e. convert between rotary motion & linear motion: (a) motor driving worm & wheel gearbox driving a pinion (b) motor driving recirculating ball-nut and leadscrew via a belt-drive.

For example, the steering gear may comprise a bar with rack (called the steering rack, or steering bar). A pinion gear that turns with the steering shaft engages the rack, such that turning of the steering wheel causes the pinion to rotate which in turn causes a translation of the steering rack. The rack is connected at each end to a wheel carrier for a road wheel of the vehicle via a tie-rod, with the wheel steering angle changing as the rack translates.

Unassisted steering systems are uncommon in most automobiles because of the high effort needed from the driver to turn the steering wheel. In an electric power assisted steering system, a motor is provided which acts upon the steering shaft or the steering rack through a worm gear and worm wheel. The torque applied to the steering wheel by the driver is detected and the motor is commanded to generate an appropriate assistance torque from the motor. This assistance torque is applied to the part of the steering system in such a way that is augments the driver applied torque. The effect is to make the steering wheel easier to turn.

In a recent development, electric power steering systems are being developed in which there is no direct mechanical link from the steering wheel to the steering rack. In effect, the steering shaft is removed. The electric motor is retained along with a means for measuring the torque applied by the driver to the steering wheel. In this arrangement, rather than augmenting the driver applied torque the motor assistance torque is the only force applied to cause the rack to translate and turn the road wheels. The motor may turn a pinion, replicating the effect of the steering shaft. In an alternative the rack may be replaced with a leadscrew with the motor acting directly on a recirculating ball-nut through a transmission driven by the motor.

For safety, it is important for the system to be able to monitor or calculate the position of the rack, i.e. where it is within the limits of translation motion available to the rack. In a conventional system, either unassisted or with a mechanical connection from the steering wheel to the rack, the position can be inferred from a measure of the angular position of the steering wheel or steering shaft. For an electric power steering system with no mechanical connection this is not possible as the angle of the steering wheel does not definitively indicate the position of the rack. It can be inferred by counting the number of rotations of the motor from a nominal start position which will be aligned with the centre of travel of the rack.

SUMMARY

The applicant has appreciated that this count can be corrupted or can be lost in the event of a power loss of the system. A start up routine to relearn the position could be implemented but this would impair the performance of the steering immediately after a start-up until the position of the rack has been relearnt.

An object of the disclosure is to provide a simple power steering system arrangement which is able to rapidly determine the position of the steering rack following start-up of the system.

According to a first aspect the disclosure provides an electric power steering system comprising a steering bar that is mechanically connected at each opposing end to a respective wheel carrier, an electric motor connected to the steering bar through a gear mechanism such that rotation of the motor causes the steering bar to translate along its main axis thereby displacing the wheel carriers, and a linear position sensor comprising at least one elongate feature that extends diagonally along a length of the steering bar such that it is inclined relative to the axis of the steering bar, and a sensing means that faces the steering bar and at any given time observes only a slice of the elongate feature that extends across the full width of the feature and along only a part of the length of the feature, the sensing means generating a signal that varies depending on the pattern formed by the feature and adjacent portions of the steering bar that is observed by the sensing means, the signal encoding the axial position of the steering bar.

Because the elongate feature is diagonal, it will move across the zone of sensitivity of the sensing means from one side to the other as the steering bar translates in one direction and in the opposite direction across the zone of sensitivity as the steering bar translates in the opposing direction. The pattern observed by the sensing element will therefore change as the position of the slice of the encoder element will move from side to side. A benefit of this arrangement is that the output of the sensor will be an absolute value that is not lost if power is removed, unlike a prior art arrangement in which a count value is stored. The elongate feature may be a raised ridge or a recessed channel. The encoder element may comprise a strip of material of a different physical property to the portions of steering bar. The elongate feature may be recessed into, or raised from, or flush with, an otherwise flat section of the steering bar. Where it is flush it may appear as a stripe.

The elongate feature may lie in a plane that is parallel to and offset from a plane containing the axis of the steering bar. Where the steering bar is a cylinder the elongate edges of the plane may lie on the radius of the cylinder, the plane effectively being formed by cutting away a portion of the cylinder. The width of the flat section may be greater than the width of the elongate feature so as to form a land on each side of the elongate feature. The sensing means may be located a small distance above the flat surface and parallel to the surface.

Most preferably the elongate feature comprises an elongate channel or slot formed in the steering bar which contains a different material to that of the steering bar adjacent the sides of the channel. The material in the channel may be air, with the slot forming an open channel. It may have any of a range of cross sections, although a u-shaped cross section is preferred. The material may be a solid material having different properties to the surrounding material of the steering bar. The top face of this solid material may be flush with the surrounding material of the steering bar.

In a simple arrangement the position of the steering bar within its range of translation may be detected from the change of pattern in which the slice of the elongate feature moves side to side as observed by the sensor element. The sensing means may comprise an array of sensor elements. Each sensor element of the sensor array may produce a single signal which varies depending on the alignment of the slice of the elongate feature with the sensor array. For instance it may vary from zero when the elongate feature slice is offset from the elongate feature and is not observed by that element to a maximum when the slice of the elongate feature is fully aligned with the sensor element. Of course, the signal could be inverted, with the maximum occurring when the elongate feature is not facing a sensor element.

In a preferred arrangement the sensor may comprise an array of sensor elements which extends orthogonal to the diagonal elongate feature or orthogonal to the axis of the steering bar, each generating a signal dependent of the relative alignment of the elongate feature with that sensor element. The signals output from all the sensor elements may be fed to a signal processor which generates from the signals a position signal indicative of the position of the steering bar. As the steering bar moves, the encoder element will move across the array causing the signals from each sensor to change and this can be detected by the signal processor. The sensor may as an alternative to an array comprise an elongate sensing element with a continuous output corresponding to the position of the feature in the direction perpendicular to the steering bar movement.

The array of sensor elements may have a length and may be oriented relative to the steering bar such that which the steering bar positioned at one end of its range of translation the portion of the slice of the elongate feature facing the sensor array is at or close to a first end of the sensor array and when the steering bar is positioned at an opposite end of its range of translation the portion of the encoder element facing the sensor is at or close to a second end of the sensor array. The appropriate length of the sensor array will therefore depend on the length of the slots, the range of translation motion allowed, and how diagonal the encoder element is.

The elongate feature, for example a slot, may have a width that is less than one third of the length of the sensor array and preferably less than one fifth of the length of the linear sensor. The width of the slot may, for example, be equal to the width of a single sensor element in the array.

In the context of this description the width of a sensor element may be considered to be the width of the zone of sensitivity of the sensor element which may be wider than the physical width of the sensor element or may be narrower. The sensor will observe anything that is located within the sensor width.

The sensor means may not comprise an array of elements. It may, for example comprise one or more magnetic sensor devices such as Hall effect sensors and at least one magnet. The Hall effect sensors may be located spaced apart and adjacent a slice of the elongate feature such that as the steering bar moves more or less of the slice is facing one sensor and the opposite is facing the other sensor. The magnet may be coupled to the steering bar and support by a metal bracket so as to form a magnetic circuit through the steering bar, bracket and Hall effect sensors/

The sensor means may alternatively comprise an inductive sensor. For example a primary coil may be located in a position to one side of the elongate feature and two secondary coils may be located adjacent the feature in much the same manner as the hall effect sensor, a closed circuit being formed around a core which supports the coils and the steering bar. The steering bar may be metal, for example steel. The skilled person will appreciate that the elongate feature may have a range of different forms and which is chosen may depend on the type of sensing means which is provided to detect the pattern formed by the slice of channel and adjacent portions of the steering bar.

The sensing means should not move as the steering bar translates and may therefore be mounted on a fixed part of the steering system such as a housing which surrounds the steering bar. A suitable array of sensor elements may comprise an array of magnetic sensor elements. It may comprise three or more sensor elements. The material of the rack on either side of the elongate feature, for example a slot, may be magnetic. In this case, the elongate feature may comprise a slot formed in the steering bar. Alternatively, the linear position sensor elements may be inductive sensor elements.

The signal may be converted into a position signal for the steering bar by applying a scaling factor to the output signal. This may be dependent on the ratio of the length of the slot to the offset between the two ends of the slot measured in a direction orthogonal to the long axis of the slot. This signal will indicate the linear displacement of the shaft as it is translated by the motor.

At least one additional reference elongate feature may be provided in the steering bar. This may extend axially along the shaft over the same length as the diagonal elongate feature. Where the diagonal elongate feature is a slot, the additional reference elongate feature may also be a slot. The slot orientation of the diagonal slot and reference slot may be selected so that the spacing between the slots, measured orthogonal to the long axis of the steering bar, varies along the length of the slots.

In an alternative to the reference slot being aligned with the axis of the steering bar it may also extend diagonally provided that the slot orientation is different from the other slot to cause the relative spacing to vary along the length of the slots. Where a reference slot is provided, the sensor elements of the sensor may determine the position of the portion of the reference slot facing the array of sensor elements and determine the position of the portion of the diagonal slot that faces the array of sensor elements and process the two together to determine the axial position of the steering bar from the spacing between the two portions of the slots.

The use of the reference slot may enable the system to be immune to any roll of the steering bar around its axis because this would not change the relative positions of the two portions of the slots facing the sensor. They may be translated along the sensor from the ideal position but the spacing would not change and this can be detected as the basis for the position measurement. The slot or each slot may be linear so that as the steering bar moves the position of the portion of the slot that faces the linear position sensor will vary linearly with the steering bar position. The slot could, in other arrangements, not be linear giving a non-linear movement relative to the position sensor as the steering bar is translated by the motor.

The slot, or each slot may be formed in a flattened portion of the steering bar. This may be offset along the rack from a toothed form that forms part of the gear mechanism that connects the motor to the steering rack. A pinion or rotating nut may engage the steering bar and connect to the rotor of the motor. The slot or each slot may be machined into the surface of the steering bar.

The steering system may further include a steering shaft that supports a steering handwheel or other user operable actuator. The system may include a torque sensor which measures the torque at the handwheel, and a signal processing unit or microprocessor which receives the torque signal and generates an assistance torque demand signal that is indicative of an assistance torque that is to be produced by the motor. The slot may be an open slot or may be filled with a non-magnetic or non-magnetically susceptible material.

BRIEF DESCRIPTION OF THE DRAWINGS

There will now be described, by way of example only, various embodiments of the present disclosure with reference to and as illustrated in the accompanying drawings, of which:

FIG. 9 shows the pattern observed in the field of view of the sensor array for the arrangement of FIG. 1 with the steering on full left-hand lock along with the output signal from each sensor element that encodes the pattern; and FIG. 10 shows the pattern observed in the field of view of the sensor array for the arrangement of FIG. 1 with the steering on full right-hand lock along with the output signal from each sensor element.

DETAILED DESCRIPTION

Figure 1:
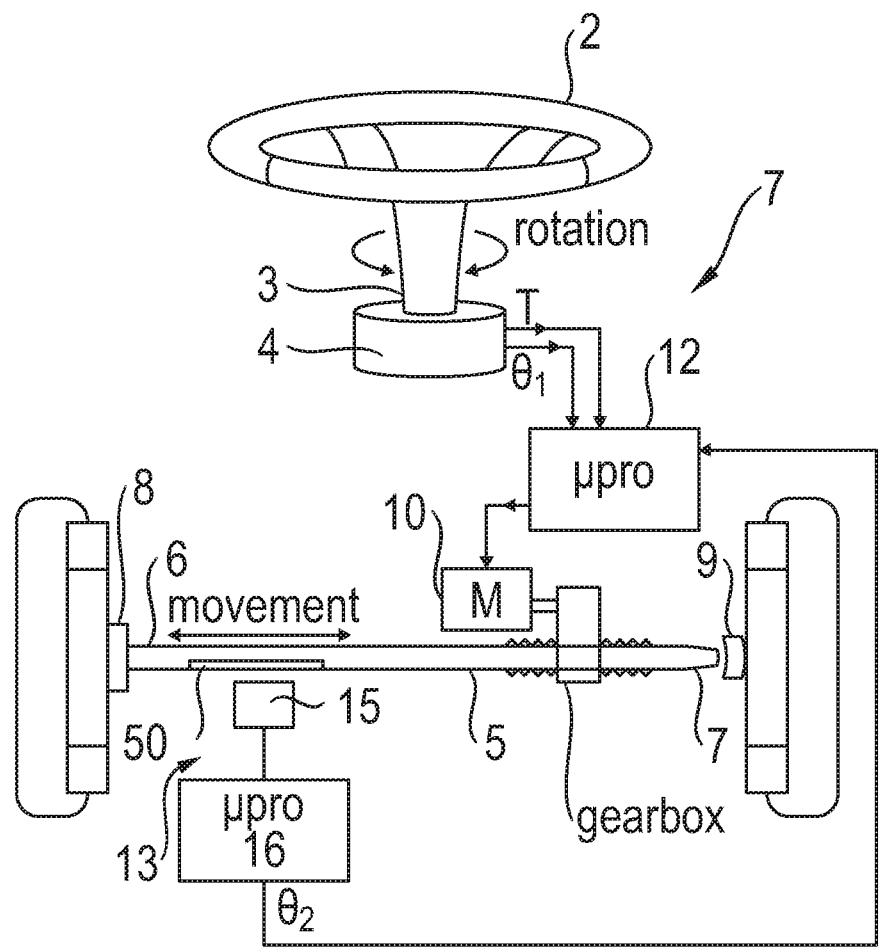
FIG. 1 is an overview of an embodiment of a steering system in accordance with the present disclosure.
Figure 2:
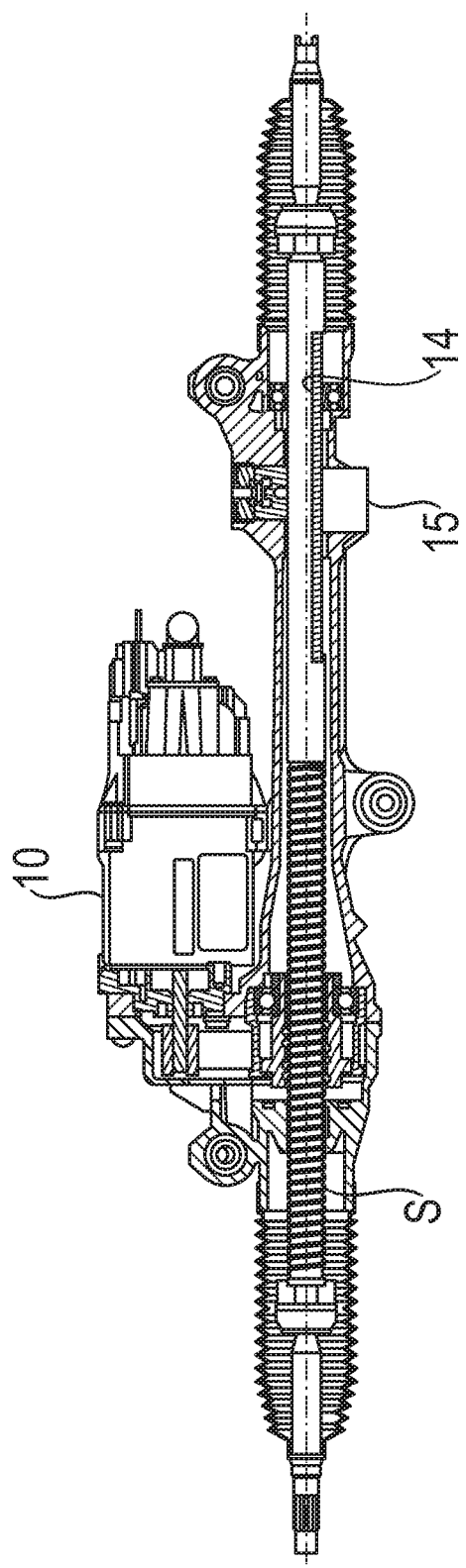
FIG. 2 is a detailed view of the steering bar and motor of the steering system.

As shown in FIG. 1, an electric power steering system 1 of the steer-by-wire kind comprises a handwheel 2 that can be turned by a driver in a conventional manner. This is supported by a stubshaft 3. A position sensor 4 measures the angular position 91 of the stub shaft 3 and a torque sensor, which is combined with the position sensor, measures the torque T applied to the handwheel 2 by the driver. Unlike a conventional steering system in which the turning of the handwheel 2 is resisted by the roadwheels of the vehicle, a mechanism for providing artificial resistance to rotation of the handwheel may be provided. This mechanism may also be used to provide artificial feedback to the driver to give a simulation of the steering feel of a conventional steering system. This mechanism is not shown in the drawings but the implementation of such a mechanism will be known to the person skilled in the art.

The system also includes an elongate steering bar 5 that is mechanically connected at each opposing end 6, 7 to a respective wheel carrier 8, 9. Each wheel carrier supports a road wheel and tyre of the vehicle in an entirely conventional manner and is arranged so that translation of the steering bar 5 causes the steering angle of the roadwheels to be changed. An electric motor 10 connects to the steering bar 5 through a gear mechanism 11 such that rotation of the motor causes the steering bar to translate along its main axis thereby displacing the wheel carriers. The gear mechanism may comprise a wormwheel which engages a worm gear on the steering bar. Alternatively, the motor may drive the steering bar through a screw drive mechanism in which the worm gear on the steering bar engages with a set of ball bearings or a nut which is rotated by the motor.

The motor 10 is driven by an assistance torque demand signal output from a signal processor 12, and the signal processor 12 generates this torque demand signal in response to the output of the torque sensor and the position sensor 4. Generally speaking, the higher the torque output from the torque sensor the higher the assistance torque demanded from the motor.

The system also includes a linear position sensor 13 that determines the axial position of the steering bar as it translates between the lock to lock positions of the steering system. The sensor 13 comprises an elongate feature in the form of an elongate open faced slot 14 that extends diagonally along a length of the steering bar. The length of the slot 14 is slightly greater than the range of translation possible for the steering bar when in use moving the steering from full lock to lock.

Figure 3:
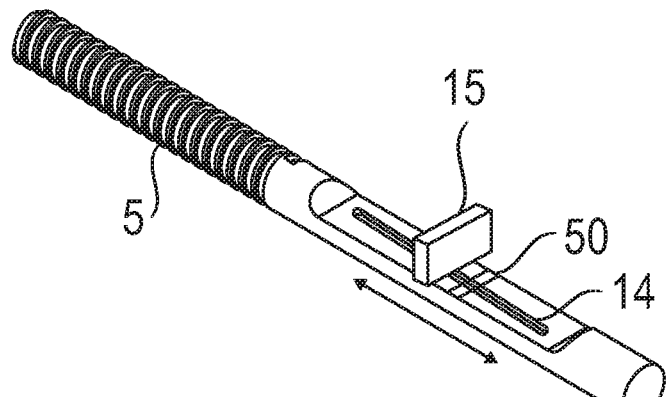
FIG. 3 is a perspective view of the sensor array relative to the steering bar showing how a slice of the elongate feature is within the field of view of the sensor array.
Figure 4:
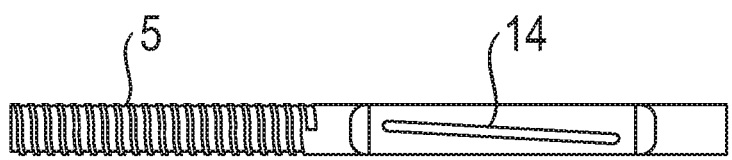
FIG. 4 is a plan view of the steering bar showing the diagonal orientation of the elongate feature.
Figure 5:
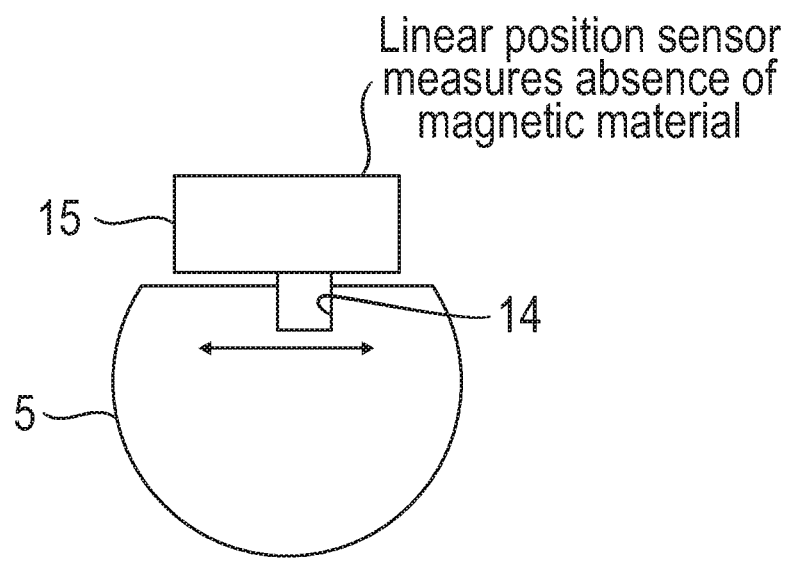
FIG. 5 is a cross section through the steering bar and the sensor array taken through the centre of the slice that is observed by the sensor array.

An elongate array of sensor elements 15 extends across the slot 14 formed in the shaft in a direction that is orthogonal to the slot 14 or to the axis of the steering bar. The sensor array 15 has a length that is greater than the width of the slot 14 and is positioned so that slot 14 always faces a portion of the sensor regardless of the axial position of the steering bar. As such, the sensor will observe a slice 50 of the slot at any given time with the depth of the slice, measured along the length of the slot, determined by the field of view of the sensor array 15. The slot and sensor array can best be seen in FIGS. 3 to 5 of the drawings.

With the steering on full lock one way, the slice of the slot observed by the sensor array will be towards one end of the sensor and with the steering on full lock the other way it will be towards the other end of the sensor. This is shown in FIGS. 9 and 10 respectively. In this example, the array comprises 8 sensor elements, each producing a zero valued signal when facing a part of the steering bar and a positive value when facing the slice of the slot 14. The pattern can be read from left to right or right to left along the array of sensor elements and is encoded as a unique sequence of values for the sensor elements of the array. Each signal output from the sensor array is fed to a signal processor 16 that combines the multiple signals to produce one output signal indicative of the position of the steering bar and hence the angle of the roadwheels.

The generation of a single output encoding the steering bar position is possible because the linear position sensor provides an output indicative of where the portion of the slot that faces the sensor is located across the width of the sensor. As such, the output depends on the pattern formed by the slot 14 and the material to the sides of the slot that is observed by the sensor array 15. The diagonal orientation of the slot forces this pattern to change as the steering bar moves from lock to lock.

From knowledge of the slot orientation and width of the slot, and hence the expected pattern seen by the sensor array at different positions of the steering bar, the steering bar position can be encoded by the output signal from the linear position sensor.

Figure 6:
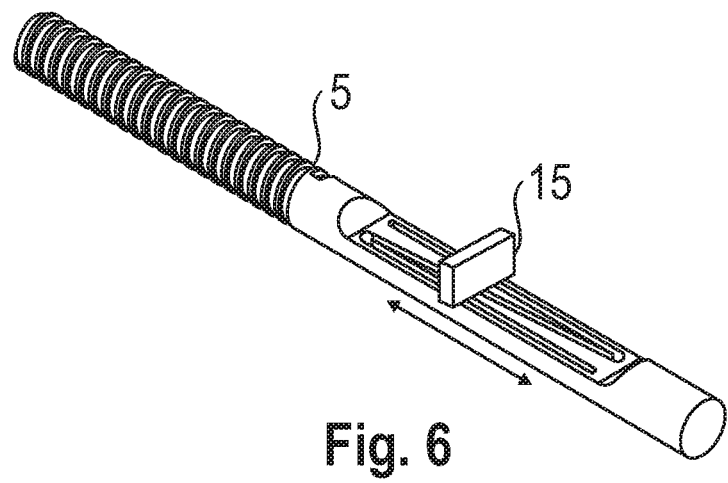
FIG. 6 is a perspective view of an alternative in which the diagonal elongate feature is located alongside two further elongate features that are parallel to the axis of the steering bar.
Figure 7:
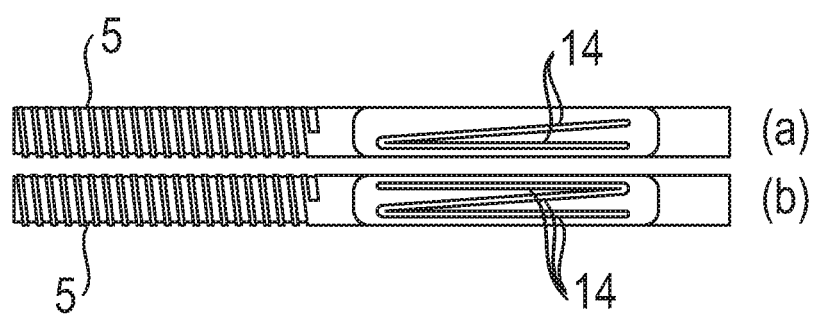
FIG. 7(a) is a plan view of the steering bar showing the diagonal orientation of the elongate feature and two further elongate features and (b) shows a further alternative with only the two elongate features.
Figure 8:
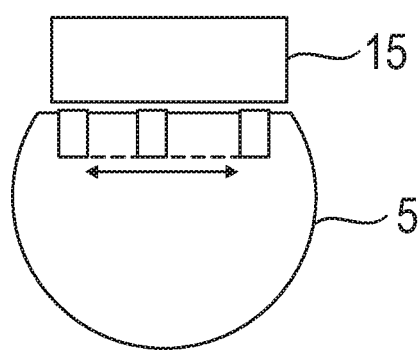
FIG. 8 is a cross section through the steering bar and the sensor array taken through the centre of the slice that is observed by the sensor array.

FIGS. 6 to 8 of the drawings show an alternative arrangement in which there are two slots, one diagonal and the other aligned with the axis of the steering bar. In this case, the pattern observed by the sensor array 15 will be more complex and include two regions corresponding to respective slices of the two slots, and the material between the slots. These two slots 14 and the land between them will move along the sensor array as the steering bar moves. The signal processor may determine from this pattern where the steering bar is along its range of travel by determining the spacing between the two slots as observed by the sensor. The actual relative location of the slots and the land in the observed pattern can be ignored. This is advantageous over the example with one slot 14 as it is immune to any lateral misalignment of the steering bar.

Figure 11:
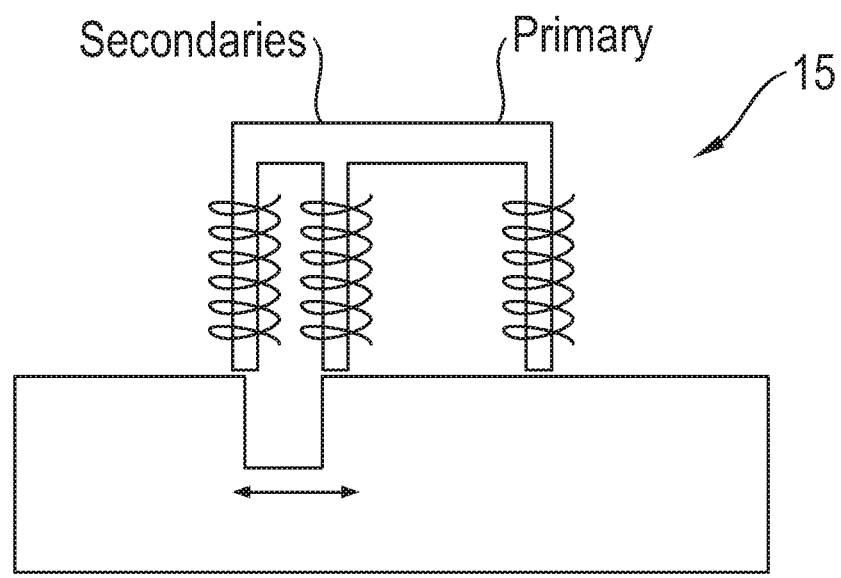
FIG. 11 is a schematic of an arrangement using magnetic sensors to detect the linear position of the steering bar.

FIG. 11 shows a circuit of a sensing means based on the use of two magnetic sensors. A pair of linear Hall effect devices measure the position of each edge of the slot 14 that forms the elongate feature. A magnet is located offset from one side of the slot 14 and a magnetic circuit is completed by the steel in the steering bar and a metal bracket that couples the magnet to the sensors. The coupling is strong where there is no-notch and weak under the notch, giving different magnetic fluxes at the Hall sensors. The linear position would be determined by the relative size of the signals from each device in a differential manner, e.g. (signal1−signal2)/(signal1+signal2).

Figure 12:
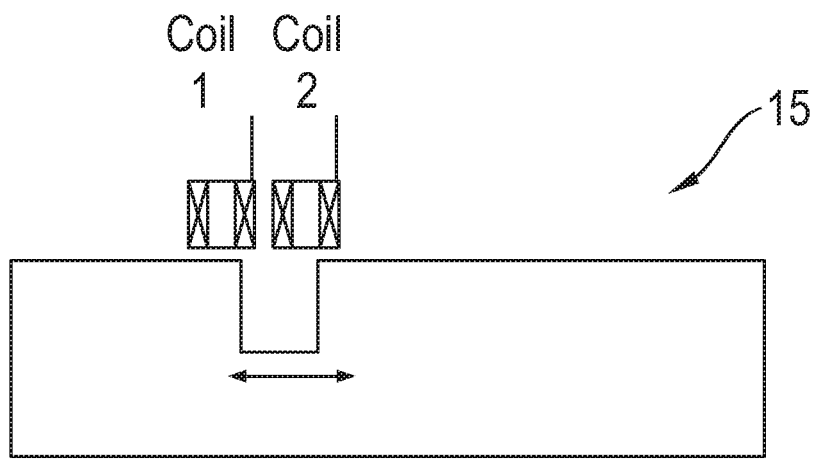
FIG. 12 shows a similar arrangement using inductive sensors.

FIG. 12 shows a sensing means based on the use of an induction type sensor. An inductive type of sensor could be a variable differential transformer. As the notch in the shaft traverses the coupling between the primary coil and one secondary coil increases, and the coupling between the primary coil and opposite secondary coil reduces. The secondaries can be wired in series in anti-phase so that the phase difference to the primary indicates the position. This is my adaptation of an LDVT that moves a core rather than moves a notch.

Figure 13:
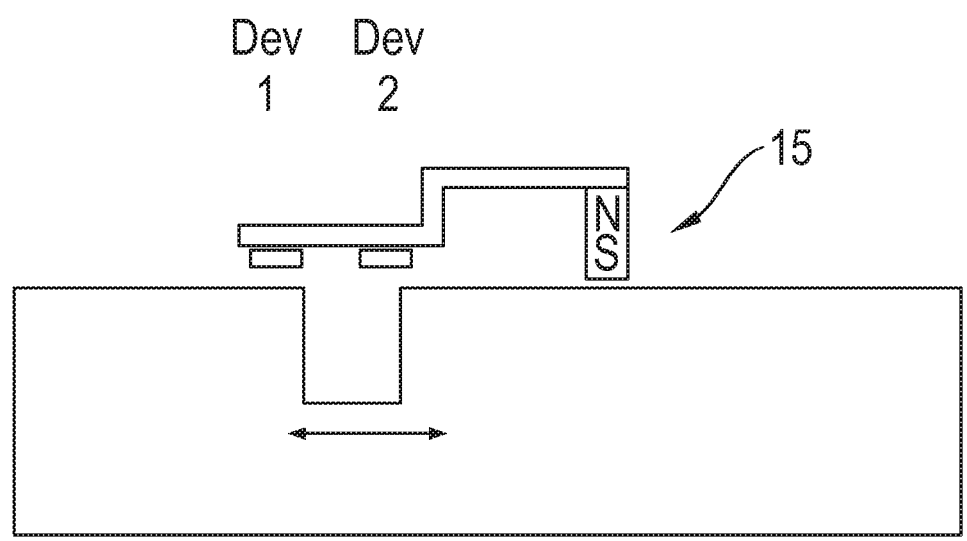
FIG. 13 shows a further alternative arrangement using an inductive sensor.

In an alternative arrangement shown in FIG. 13, a pair of inductive proximity sensors might be used to form the sensing means. The slot would reduce the inductance of the coil. A circuit would measure the relative inductance of the 2 coils and the difference is used to determine the position of the slot.

What is claimed is:

1. An electric power steering system comprising:
   a steering bar that is mechanically connected at each opposing end to a respective wheel carrier;
   an electric motor connected to the steering bar through a gear mechanism such that rotation of the electric motor causes the steering bar to translate along its main axis thereby displacing each wheel carrier;
   at least one elongate feature extending diagonally along a length of the steering bar such that it is inclined relative to the main axis of the steering bar; and
   a sensor that faces the steering bar and at any given time observes only a slice of the elongate feature that extends across a full width of the elongate feature and along only a part of a length of the elongate feature, the sensor generating a signal that varies depending on a pattern that is formed on the steering bar by the elongate feature and adjacent portions of the steering bar and that is observed by the sensor, the signal encoding the axial position of the steering bar.

2. The electric power steering system according to claim 1 in which the elongate feature comprises a raised ridge or a slot.

3. The electric power steering system according to claim 2 in which the elongate feature lies in a plane that is parallel to and offset from a plane containing the main axis of the steering bar.

4. The electric power steering system according to claim 3 wherein the sensor comprises an array of sensor elements which extends orthogonal to the diagonal elongate feature or orthogonal to the main axis of the steering bar, each generating a signal dependent of the relative alignment of the elongate feature with that sensor element.

5. The electric power steering system according to claim 4 wherein at least one additional reference elongate feature is provided that extends axially along the shaft over the same length as the diagonal elongate feature.

6. The electric power steering system according to claim 5 wherein the slot orientation of the reference feature and the other elongate feature are selected so that the spacing between the features, measured orthogonal to the main axis of the steering bar, varies along the length of the features.

7. The electric power steering system according to claim 6 in which the sensor determines the position of the portion of the reference feature facing the sensor and determines the position of the portion of the other feature that faces the sensor and process the two together to determine the axial position of the steering bar from the spacing between the two slices of the two features.

8. The electric power steering system according to claim 4 wherein each sensor element is a magnetic sensor element.

9. The electric power steering system according to claim 4 wherein the array of sensor elements has a length and orientation relative to the steering bar such that the slice of the elongate feature facing the array of sensor elements is at or adjacent to a first end of the array of sensor elements when the steering bar is positioned at one end of a range of translation, and the slice of the elongate feature facing the array of sensor elements is at or adjacent to a second end of the array of sensor elements when the steering bar is positioned at an opposite end of the range of translation.

10. The electric power steering system according to claim 1 wherein the elongate feature translates relative to the sensor.

11. The electric power steering system according to claim 1 wherein the gear mechanism includes a toothed portion of the steering bar, the toothed portion and the elongate feature being separated from one another along the length of the steering bar.

* * * * *